United States Patent [19]

Veith

[11] 3,956,667

[45] May 11, 1976

[54] LUMINOUS DISCHARGE DISPLAY DEVICE

[75] Inventor: Werner Veith, Munich, Germany

[73] Assignee: Siemens Aktiengesellschaft, Berlin & Munich, Germany

[22] Filed: Mar. 14, 1975

[21] Appl. No.: 558,495

[30] Foreign Application Priority Data

Mar. 18, 1974 Germany .......................... 2412869

[52] U.S. Cl. ........................ 315/169 TV; 178/7.3 D; 313/217; 315/58; 357/45

[51] Int. Cl.² ...................... H04N 3/16; H05B 37/00

[58] Field of Search ...................... 178/7.3 D, 7.5 D; 313/188, 217, 220; 315/58, 169 TV; 357/45

[56] References Cited

UNITED STATES PATENTS

| | | | |
|---|---|---|---|
| 3,624,273 | 11/1971 | Gale | 315/169 TV X |
| 3,754,161 | 8/1973 | Johnson | 315/169 TV |
| 3,862,360 | 1/1975 | Dill et al. | 315/169 TV X |

*Primary Examiner*—R. V. Rolinec
*Assistant Examiner*—Lawrence J. Dahl
*Attorney, Agent, or Firm*—Hill, Gross, Simpson, Van Santen, Steadman, Chiara & Simpson

[57] ABSTRACT

A luminous discharge device having a gas filled, gas tight envelope. A cathode is disposed at one side interiorly of the envelope and a luminescent target is disposed at the opposite side of the envelope. An insulating substrate is perforated in the form of a matrix and is positioned intermediate of the cathode and the luminescent target. The insulating plate has a series of rows of anodes disposed on one side thereof and a series of columns of controlled electrodes arranged at the other side thereof in a direction which is generally perpendicular to the anodes. The spacing between the anodes and the cathode is of such a value as to induce a normal gas discharge therebetween while the spacing between the controlled electrodes and the luminescent target is arranged to be such as to prevent a normal gas discharge. By applying a suitable signal to develop a gas discharge adjacent to a given row of anodes and simultaneously applying a selected positive voltage to at least one of the control electrode columns, an electron flow can be induced through a specific one of the holes in the matrix to impinge upon a predetermined spot on the luminous target and thereby produce a video response.

19 Claims, 3 Drawing Figures

Fig.1
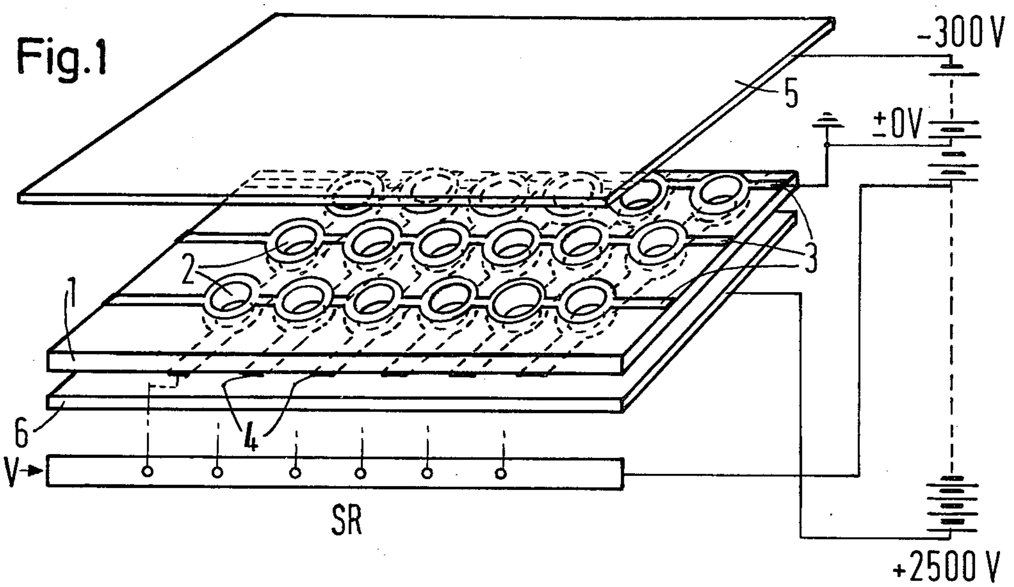
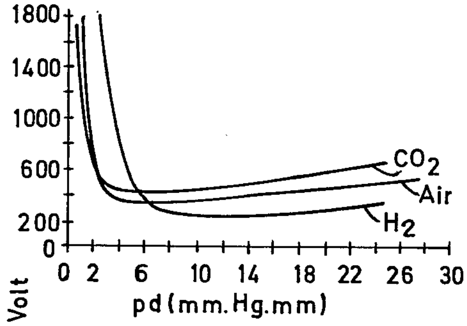
Fig.2
Fig.3
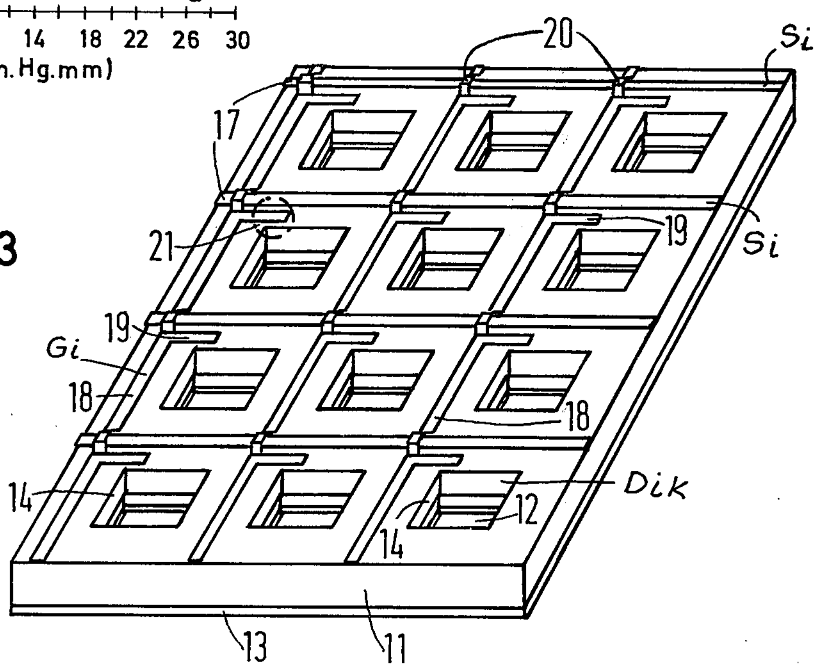

LUMINOUS DISCHARGE DISPLAY DEVICE

BACKGROUND OF THE INVENTION

1. Field of the Invention

The invention has a particular significance in optical-electronic image reproduction devices, as in televisions and other displays, both black and white and in color.

2. Description of the Prior Art

U.S. Pat. No. 3,704,386 shows a display panel with a gas discharge cell matrix in which intersection points of parallel-wire electrodes disposed at right angles to one another each define scanning cells or display cells. Individual scanning cells in a bistable mode of operation provide directly illuminated image points of one or more selected gas discharge colors. When discharge intensity is increased, ultra-violet radiation is produced which by striking a phosphorescent material creates a display of a second or third color.

The drawback of this prior art arrangement is the bistable mode of operation by which images can be reproduced neither in grey tones nor with a conventional color structure based upon the three primary colors. In addition, the ultra-violet light which is secondarily produced cannot be concentrated into a beam and therefore cannot selectively excite a specific phosphorescent dot. Furthermore, the intensity is below the level of brilliance required for television image reproduction.

SUMMARY OF THE INVENTION

It is an important feature of the present invention to provide an improved luminous discharge display device which overcomes the difficulties of the prior art by the use of a new mode of operation. It is a principal object of the present invention to provide a luminous discharge device including a gas filled envelope having a cathode at one side thereof and a luminescent screen electrode at the other side wherein a perforated insulating substrate is disposed intermediate the cathode and the screen electrode and control means are provided to regulate the flow of electrons through the perforations in the substrate to impinge upon a predetermined location on the luminescent screen electrode.

Another object of the present invention is to provide a luminous discharge display device as described above wherein the perforated substrate has rows of anodes on one side thereof and being aligned with the perforations therein and wherein columns of screen electrodes are formed at the other side thereof and being aligned with the perforations but in a direction which is perpendicular to the alignment of the rows.

In accordance with these objects, a cathode and anode defining an auxiliary gas discharge space are arranged at an adequately large distance from one another to create normal glow discharges at one side of the perforated insulating plate with the application of a few hundred volts between anode and cathode. On the other side of the plate are the parallel rows of control electrodes. An imperforate superficial luminescent screen electrode, which may be divided into a plurality of colors triads, is fixed at a substantially smaller distance from the control electrode to prevent any gas discharge even at several thousand volts potential difference between the control electrode and the screen electrode.

Electrons produced in glow discharges which are triggered row by row, are controlled point by point in intensity by imposition of signals on successive control electrode columns. The electrons are accelerated through the substrate perforations toward the positively charged screen electrode, and the beam is reproduced there as an image point. Because of the adequately small electrode distance chosen (taken from the Paschen-type discharge characteristic in order to avoid the possibility of a gas discharge) and because of the division produced by the perforation matrix structure, production of differentiated brilliance of defined image points are directly possible, using a triad system of control.

As a part of these objects, the perforated insulating plate (formed of glass, ceramic or for that matter of a synthetic material having an adequately low vapor pressure) divides the overall discharge space essentially into an auxiliary gas discharge space and an electron acceleration space in such a fashion that the gas discharge is apportioned into respective holes in the matrix.

The auxiliary gas discharge space, with a technically suitable gas and gas pressure to correspond to the Paschen discharge characteristics, will for example measure about 1 cm and the electron acceleration space will be substantially shorter than 1 cm, for example only about 1/10 the length of the auxiliary gas discharge space or in the given case about 1/10 cm. The transmission coefficient of the perforation matrix is chosen in excess of 20% while the number of holes, considering the case of a black and white television image reproduction screen, will be about $5 \times 10^5$ and in the case of a color television screen, about $1.5 \times 10^6$.

It is also an object of the invention to provide such a system where the perforation matrix has parallel conductor paths which are separated from each other. The arrangement being such that the row conductor paths are disposed on one side and the image point conductor paths are disposed on the other side of the matrix. These vapor conductor paths may be produced by using conventional techniques such as deposition or photographic processes, and at the perforations in the matrix they will either have corresponding openings or extend along the periphery of the individual holes as two split paths.

It is a feature of one embodiment, which is particularly simple from the technical point of view, to have the conductor paths at either side of the perforated plate consist of parallel wire. Where color reproduction is concerned, to account for the fact that there will be three times the number of image points, the number of conductor paths will be increased by a factor of three. It is particularly advantageous to do this with the row conductor paths, because otherwise at least three separate intermediate stores would be required for the individual color signals.

It is an object of the invention in connection with the operation of the luminous display device, to apply sequentially to the individual longitudinal elements of the auxiliary anode a positive voltage of some few hundred volts, to apply to the screen electrode a constant positive potential of some few thousand volts, and to apply to the control electrode not only a bias voltage, but also, the relevant video signals with the help of intermediate stores for the individual rows. These voltages are applied simultaneously.

It is an advantageous further object to increase the image brilliance by utilizing a storage effect in which the video signal is applied by means of at least one intermediate store. In order for a planar transistor to be used, a modified design of the electrodes thus far described is required. A control electrode which is not electrically connected and which is divided into separate points, and, additionally, two other electrodes constituted by mutually intersecting electrode elements doing duty as row and image point electrodes. For this purpose the elements of the auxiliary anode are for example electrically connected with one another so that they form a cohesive electrode surface. Moreover, at the rear side of the perforation matrix, a corresponding number of mutually intersecting and mutually insulated parallel conductor paths is applied, to do duty as row and column point conductor paths. The special feature of this kind of embodiment resides in the fact that in the neighborhood of the points of intersection in each case a planar transistor is formed in such a fashion that the row conductor paths form the source, with short lateral stubs, the image point conductor paths disposed perpendicularly thereto form the gate, while insulated metal rings surrounding the holes form the drain, the semi-conductor material itself being applied in a large-area fashion. It is of particular advantage to apply the semi-conductor material by vapor deposition, and materials which are suitable for this kind of process are, for example, ZnS, CdS, CdSe or Te. For reasons of safety, the transistor matrix is covered with an insulating protective layer of, for example, SiO, $SiO_2$ or the like.

Further features, advantages and objects of the invention will be understood from the following description and associated drawings wherein reference numerals indicate a preferred embodiment.

BRIEF DESCRIPTION OF THE DRAWINGS

FIG. 1 is a perspective view of the insulated perforation matrix and electrodes attached thereto, and showing the spatial relationship of the cathode and the screen electrode as well as the corresponding electrical connections.

FIG. 2 illustrates the discharge characteristics of a number of gases in accordance with the Paschen law, from Cobine, "Gaseous Conductors", Dover Publications, Inc., New York, 1957, pages 164–165.

FIG. 3 shows an alternate embodiment of an insulated perforation matrix using metal-rimmed holes as control electrodes and perpendicularly-intersecting row and image point electrodes for transistor storage devices.

DESCRIPTION OF THE PREFERRED EMBODIMENTS

In FIG. 1, an insulating perforated plate or perforation matrix 1 is made of quartz, glass, ceramic or a synthetic material having low vapor pressure, the matrix containing a plurality of regularly disposed holes 2. About and between these holes on an upper side thereof there are, extending in rows in one direction, drive electrodes in the form of applied conductor paths 3. These serve as anodes for the auxiliary gas discharge space. The conductor strips or paths 3 may be applied to the substrate 1 by printing, vapor deposition, or a photographic process. The conductor path 3 passes around each opening 2, continuing from the opposite side thereof in a narrow conductor as shown. At the underside of the perforation matrix 1, conductor paths 4 form individual image points or control electrodes, extending perpendicularly to the row electrodes 3 and being applied in the same fashion to the matrix 1.

A solid cathode 5 is spaced from the anodes 3 to serve as one of the two electrodes of gas discharge space between anode 3 and cathode 6. A screen electrode 6 is spaced a shorter distance from the control electrodes 4.

When an individual row 3 is driven by raising its potential, a gas discharge occurs near the row and is initially maintained because the other row electrodes have a floating potential or are at cathode potential. From this narrow gas discharge strip the control electrodes 4 for the individual image points located at the side of the perforation matrix 1, can extract electrons through the individual holes 2. Such extraction may occur either successively among the control electrodes 4 or simultaneously, depending upon whether the control signal itself is applied sequentially or simultaneously. An intermediate store in the fashion of a shift register SR may be employed to trigger simultaneously a whole control row 4 for the individual image point conductor paths, if the relevant control signals have a corresponding positive value. Despite the high positive field strength, no gas discharge occurs in the space between electrodes 4 and 6 because the discharge space length is adequately small to avoid a Paschen discharge.

Upon switching to a next row, the gas discharge again strikes, its new ignition being facilitated by the residual ionization near the preceding row. The gas discharge thus skips from row to row with the row driving frequency and remains confined to the gas discharge space. The image point grid arranged at the other side of the perforation matrix and likewise subdivided into parallel elements, thus functions as a control grid 4, acting through the holes to control the intensity of the electrons extracted from the gas discharge by the high voltage on the screen electrode 6. If the screen electrode 6 is negatively biased vis-a-vis the anode 3, which itself is substantially at earth potential, the electron stream will be blocked.

As those skilled in the art will realize, in accordance with the Paschen Law set out in FIG. 2, where the discharge voltage is plotted on the ordinate gas pressure × electrode interval $= p \times d$ on the abscissa, it is possible at a given gas pressure and electrode spacing to read off the voltage below which ignition cannot occur and no gas discharge is possible. Below a minimum value of this product for a particular gas the discharge voltage or minimum ignition voltage rises very steeply; in the case for example of argon (not shown), this value is 0.9 mm Hg × mm at 137V. At a low pressure, about 1 mm Hg, and a distance between cathode 5 and anode 3 of about 1 cm, it is possible to strike or ignite and maintain a discharge in any of several gases at as little as a few hundred volts. In the electron acceleration space between electrodes 4 and 6, because of the much smaller electrode distance, a much higher voltage, some few thousand, can be applied without causing a discharge to occur. Thus, the ignition of a gas discharge is determined for given values of gas pressure and voltage by the distances between the electrodes in the gas.

The electrons produced from the gas discharge, as from a large-area cathode, can, because of the high field strength prevailing in the acceleration space between a hole 2 and the electrode screen 6 and also because of the gas, strike a specific image point on the screen 6 in a concentrated beam without interfering with neighboring image points. With individual control of the individual electron beams through the holes 2 by control of anode row and control electrode column potentials, substantially the same conditions may be achieved as in a conventional cathode ray tube. The value of the mean acceleration potential, corresponding to a direct bias voltage on the control grid 4, can also be employed to optimize beam focussing; focussing in any event is not difficult because of the short distance between the bottom surface of the matrix 1 and the screen electrode 6. The arrangement described corresponds somewhat to a large-area hot cathode. Gases such as neon and argon are suitable since their striking voltages are very much lower than for example that of air. Also, argon has little unwanted luminosity.

To drive the image points of an anode of row 3, individual signals such as video signals are applied in timed sequence to successive conductor paths of the control electrodes. Thus electron streams from the discharge zone passing through the holes 2 impinge successively, point by point, on the screen electrode 6, each for a very short time, i.e., only for as long as the signal persists on an electrode 4 under the discharge conditions for an anode row 3. Because this time is very short, screen images produced in this manner are more or less dark as a whole.

It is possible to brighten the image produced by preprocessing signals corresponding to the content of a complete anode row in a buffer or intermediate store in accordance with the operation of the series shift register SR to apply all control electrode signals for all points on an anode row 3 simultaneously to all the conductor paths 4. The processing and reorganization of the relevant video signal to form a signal which is matched to the requirements of the matrix may take place in a series shift register SR with a corresponding number of parallel outputs, for example about 800, after the manner of a 625 line television picture. In the series shift register SR, the video signal is shifted point by point until individual registers, consisting of semiconductor stores, are filled.

To achieve maximum brilliance in the discharge display device for a black and white picture, the discharge duration of an anode row 3, of 64 microseconds, must be fully exploited for storage. The register SR, however, also requires this amount of time to become full so that accordingly two such stores can be arranged to operate alternately to process the signals, e.g., one each for the even and odd rows. Thus, based upon the normal line periodicity of 64 microseconds encountered in television pictures for example, a substantial brilliance can be achieved.

If, however, the individual electron streams are to persist for a longer period of time, then the video signal must be stored individually with respect to each point in the matrix. To do this a matrix drive system is suitable, signal input being carried out using a three-terminal device, e.g. in the form of a transistor. An integrated system of 500,000 transistors is required over an area corresponding to that of a television screen. This problem can be met by a thin-film technique, employing field-effect transistors.

An arrangement of the transistors in the discharge device has been shown schematically in FIG. 3. A control grid 14 for controlling the passing electrons is formed by a metal rim around each square hole 12 in an insulated perforation matrix 11. The matrix wiring is arranged at the top side of the perforation matrix and consists of row electrodes 17, marked $S_i$ for source or base, and of image point electrodes 18, marked $G_i$ for gate or collector. Each control electrode 14, also marked $D_{ik}$ for drain or emitter, is divided into individual rings and is not connected to the other wiring. A metallic underside 13 of the perforation matrix serves as a perforated anode, and a capacitor with each of the control electrodes 14. Transistors 21 are each located near points of intersection 20 between the S and G lines, the G lines having extensions 19 from line 18 and parallel to line 17. The intersection area is coated after assembly with an insulating layer to prevent chemical and mechanical changes in the transistors.

When using sequential drive techniques, operating point by point, and individual storage for each image point, the video signal V or a signal processed in a series shift register SR is applied to the individual conductor paths 18 ($G_i$). To drive a single row, a potential positive in relation to the cathode is applied to one of the row electrodes 17 ($S_i$). Because the control electrodes 14 ($D_{ik}$) are initially at earth potential or at a negative potential, then depending upon the potential of the particular $G_i$ electrodes a current of varying intensity flows toward the row electrode 17; this flow charges the individual control electrodes 14 ($D_{ik}$) to a positive potential peak. This potential peak then controls the actual electron flow from the gas discharge space (below 13, not shown) to the screen electrode (above 11, not shown), thus switching on an individual electron beam with a desired intensity. This electron stream continues to flow as long as the control electrode 14 ($D_{ik}$) is sufficiently positively charged.

During this control operation, the capacitor between the control electrode 14 ($D_{ik}$) and the anode 13 is charged. Accordingly, the capacitance serves as an individual store vis-a-vis each electron beam. The charge and therefore the control voltage of each capacitor can be reached by allowing for selected leakage currents; however, should such currents be too weak the capacitors can also be shunted by a vaporised-on resistive layer connecting the electrodes 14 and 13, so that a determinate time constant is produced. Should leakage currents be too great, they can be reduced as by increasing the size of the holes 12 in the perforation matrix ll, i.e., enlarging the control grid openings 14 in relation to the openings in the earthed auxiliary anode 13 at the back of the perforation matrix.

By advancing the constant bias voltage on the conductor paths 17 ($S_i$), one row after another may be driven in the same way.

By advancing also the signals on the $G_i$ image point electrodes, the video signal is driven in a point by point sequence. However, it is better to use the procedure described above, in which the video signal is stored in a buffer store or intermediate store SR, i.e., is prepared by a series shift register, and the signal for a complete row is simultaneously applied to all image point electrode lines 18 ($G_i$) in that row. The prime advantage, among others, of this method is that the picture or image exhibits less flicker, in particular, however, time is gained for the charging up of all the capacitors, intersection points 20, and conductors 17 ($S_i$), to the full video signal. If the entire time interval, for example 64 microseconds in the case of television pictures, available for an individual row is used, a very bright image is achieved.

The system is also suitable for purely static displays in lieu of moving images. The storage capacity of a device for a static display must be comparatively large and the leakage current from the control electrode 14 small in comparison to a device for a moving image display.

The arrangement described is also suitable for color displays. Three times the number of $S_i$ or $G_i$ conductor paths is needed; to achieve the smallest possible switching capacitance, it is better to increase the number of row conductor paths $S_i$. The individual color components signals must also be applied simultaneously to each color row. Thus, for each of three color rows, only a third of the former time, about 21 microseconds, is available for electron flow. A weak video signal on the transistors can in some cases be compensated for by the use of a higher beam intensity or by an increased signal storage time.

The principle of creation of a gas discharge current and electron stream in a space and the partial separation thereof from a second space having a shorter path length and higher field strength is in no way limited to the television-screen display device described here but is of quite general application. This principle is applicable to other display devices and tubes operating with gas discharge mechanisms, to achieve greater brilliance as well as the attainment of clear color production with bistable storage operation.

I claim as my invention:

1. A luminous discharge device comprising: a gas-filled, gas tight envelope; a cathode positioned at one side of the envelope; a luminescent screen electrode positioned at an opposite side of the envelope; an insulating plate being regularly perforated and being spaced intermediate of said cathode and said screen electrode, a series of rows of anodes being disposed on said plate in alignment with said perforations, a series of columns of control electrodes being disposed on the other side of said plate in alignment with said perforations and being at a substantial angle to said rows of anodes; the anodes each being spaced a distance from said cathode sufficient to induce a normal gas discharge therebetween, and the control electrodes each having a distance from said screen electrode too short to allow a normal gas discharge therebetween, means for applying a relatively low voltage between said cathode and said anodes on the insulating plate to develop a gas discharge therebetween, means for developing on the other side of the insulating plate, a relatively high voltage between said control-electrodes and said luminescent screen electrode, said relatively high voltage being lower than the value required to produce a gas discharge between said control electrode of the insulating plate and said screen electrode, means for selectively triggering a gas discharge adjacent said rows of anodes, and means for selectively applying a positive potential to said control electrode columns for forming an image on said luminescent screen by extraction of electrons through said perforations in said insulating plate.

2. A luminous discharge device in accordance with claim 1 wherein said insulating plate is formed of a material having a low vapor pressure and wherein said plate defines a gas discharge space between one of the anodes and the cathode and also defines an electron acceleration space between the control electrodes and the luminescent screen.

3. A luminous discharge device in accordance with claim 1 wherein the rows and columns are disposed at opposite sides of the perforated plate with the rows being parallel to each other, the columns being parallel to each other, and the rows being generally perpendicularly arranged with respect to the columns.

4. A luminous discharge device in accordance with claim 1 for the reproduction of color pictures wherein the number of one sort of conductor paths is three times the number required for a black and white discharge device.

5. A luminous discharge device in accordance with claim 1 wherein the conductor paths including the rows and columns are applied to the insulating plate by a technique selected from the group consisting of printing, vapor deposition, and photographic processes, and wherein the conductor paths are applied immediately adjacent to the individual holes in the insulating plate.

6. A luminous discharge device in accordance with claim 1 wherein the conductor paths including the rows and columns consist of parallel arranged wires.

7. A luminous discharge device in accordance with claim 2 wherein said gas discharge space measures approximately 1 cm and the electron acceleration space measures approximately 1/10 of the gas discharge space.

8. A luminous discharge device in accordance with claim 7 wherein the transmission coefficient of the insulating plate perforation matrix exceeds 20%.

9. A luminous discharge device in accordance with claim 1 wherein the number of perforations in the insulating plate is approximately $5 \times 10^5$ for a black and white luminescent screen and approximately $1.5 \times 10^6$ for a color luminescent screen.

10. A luminous device in accordance with claim 1 wherein in relation to cathode potential, means are provided for applying a constant positive potential of some few hundred volts to the anode rows, a few thousand volts to the screen electrode and a direct bias voltage as well as a video signal to the control electrodes, means utilizing a data storage device to apply said video signal, and means for applying each of said voltages simultaneously in respect to a single entire row of anodes.

11. A luminous discharge device in accordance with claim 1 wherein the rows of anodes are allegedly connected together to form an intrical electrode surface and wherein at the opposite side of the insulating plate, a number of mutually perpendicularly intersecting parallel conductor paths are applied, said paths being insulated from one another.

12. A luminous discharge device in accordance with claim 11 wherein a transistor is formed upon the insulating plate in such a manner that the row conductor paths act as a source, the control conductor paths act as a gate, and insulated metal margins surrounding the perforations act as a drain.

13. A luminous discharge device in accordance with claim 12 wherein said insulating plate arrangement is formed by a vapor deposition process.

14. A luminous discharge device in accordance with claim 13 wherein the semi-conductor material utilized is selected from a group consisting of ZnS, CdS, CdSe or Te.

15. A luminous discharge device in accordance with claim 14 wherein the insulating plate including the transistor matrix is covered with an insulating protective layer selected from the group consisting of SiO and $SiO_2$.

16. A luminous discharge device as defined in claim 1, wherein said screen electrode is divided into sets of rows of color triads corresponding to and aligned with said anode rows, one particular color being emitted by one of said triads upon triggering of a gas discharge to each anode row.

17. A luminous discharge device as defined in claim 1, further defined by the anode rows and control electrode comprising a conductor path aligned with the matrix perforations in the respective rows and columns, and each path passing around the periphery of each matrix perforation in the form of two split paths.

18. A luminous discharge device comprising: a gas-filled, gas tight, generally thin and flat envelope; a cathode forming one flat surface of the envelope; a luminescent screen electrode forming the opposite flat surface of the envelope; an insulating plate forming a perforating matrix and spaced apart from said cathode and adjacent said screen electrode, the plate being regularly perforated, the plate having on a side thereof toward the cathode an extended perforated anode surface, the plate having on an opposite side thereof, toward the screen electrode, a series of row electrodes extending in one direction between parallel rows of matrix perforations, a series of image point electrodes extending perpendicularly to the row electrodes and insulated therefrom and spaced between each pair of adjacent matrix perforations each column electrode having a series of short stubs extending between its adjacent row electrode and the adjacent matrix perforation; and the insulating plate having upon an interior surface of each of its perforations and adjoining the side thereof toward the screen electrode a control electrode; the row electrodes and image point electrodes defining intersection points there among adjacent each of which is applied a thin semi-conductor film forming a three-terminal transistor, one terminal connected to the row electrode, one to the image point electrode stub, and one to the control electrode of an adjacent perforation, for signal storage source, gate, and drain purposes, respectively.

19. A luminous discharge device as defined in claim ll, wherein the side of said insulating plate towards said screen electrode is coated at least in the area of said transistors with an insulating protective layer.

* * * * *

REEXAMINATION CERTIFICATE (93rd)

United States Patent [19]
Veith

[11] B1 3,956,667
[45] Certificate Issued Jun. 7, 1983

[54] LUMINOUS DISCHARGE DISPLAY DEVICE

[75] Inventor: Werner Veith, Munich, Fed. Rep. of Germany

[73] Assignee: Siemens Aktiengesellschaft, Berlin & Munich, Fed. Rep. of Germany

Reexamination Request
No. 90/000,237, Aug. 4, 1982

Reexamination Certificate for:

| | |
|---|---|
| Patent No.: | **3,956,667** |
| Issued: | **May 11, 1976** |
| Appl. No.: | **558,495** |
| Filed: | **Mar. 14, 1975** |

[30] Foreign Application Priority Data
Mar. 18, 1974 [DE] Fed. of Germany ........... 2412869

[51] Int. Cl.³ ....................... H05B 41/00; H04N 3/00

[52] U.S. Cl. .................. 340/703; 315/58; 315/169.4; 340/811; 340/719/ 358/240

[58] Field of Search ... 315/58; 169.4, 349; 340/703, 811, 719; 358/240; 313/485

[56] References Cited

U.S. PATENT DOCUMENTS

| | | | |
|---|---|---|---|
| 2,558,019 | 6/1951 | Toulan | 358/230 |
| 3,622,829 | 11/1971 | Natanabe | 315/169.4 X |
| 3,704,386 | 11/1972 | Cola | 313/188 X |
| 3,753,041 | 8/1973 | Lustig et al. | 340/769 |
| 3,800,186 | 3/1974 | Yamane et al. | 340/772 |
| 3,801,864 | 4/1974 | Yamane et al. | 340/772 |
| 3,845,241 | 10/1974 | Schwartz | 315/169.4 X |
| 3,875,442 | 4/1975 | Wasa et al. | 313/217 |

FOREIGN PATENT DOCUMENTS

| | | |
|---|---|---|
| 261371 | 9/1971 | Japan. |
| 4861072 | 8/1973 | Japan. |

*Primary Examiner*—E. LaRoche

*Attorney, Agent, or Firm*—Hill, Van Santen, Steadman, Chiara & Simpson

[57] ABSTRACT

A luminous discharge device having a gas filled, gas tight envelope. A cathode is disposed at one side interiorly of the envelope and a luminescent target is disposed at the opposite side of the envelope. An insulating substrate is perforated in the form of a matrix and is positioned intermediate of the cathode and the luminescent target. The insulating plate has a series of rows of anodes disposed on one side thereof and a series of columns of controlled electrodes arranged at the other side thereof in a direction which is generally perpendicular to the anodes. The spacing between the anodes and the cathode is of such a value as to induce a normal gas discharge therebetween while the spacing between the controlled electrodes and the luminescent target is arranged to be such as to prevent a normal gas discharge. By applying a suitable signal to develop a gas discharge adjacent to a given row of anodes and simultaneously applying a selected positive voltage to at least one of the control electrode columns, an electron flow can be induced through a specific one of the holes in the matrix to impinge upon a predetermined spot on the luminous target and thereby produce a video response.

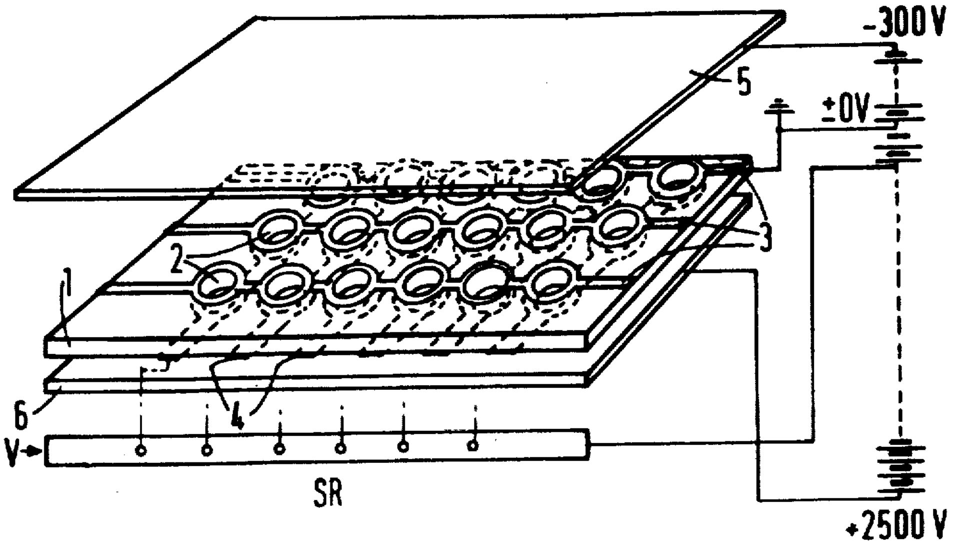

REEXAMINATION CERTIFICATE ISSUED UNDER 35 U.S.C. 307.

THE PATENT IS HEREBY AMENDED AS INDICATED BELOW.

Matter enclosed in heavy brackets appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 18 is confirmed.

Claims 11-15 having been finally determined to be unpatentable, are cancelled.

Claims 1 and 19 are determined to be patentable as amended:

1. A luminous discharge device comprising: a gas-filled gas tight envelope; a cathode positioned at one side of the envelope; a luminescent screen electrode positioned at an opposite side of the envelope; an insulating plate being regularly perforated and being spaced intermediate of said cathode and said screen electrode[,], *said cathode comprising a plate-like surface facing the insulating plate;* a series of rows of anodes being disposed on said plate in alignment with said perforations[,]*;* a series of columns of control electrodes being disposed on the other side of said plate in alignment with said perforations and being at a substantial angle to said rows of anodes; the anodes each being spaced a distance from said cathode sufficient to induce a normal gas discharge therebetween, and the control electrodes each having a distance from said screen electrode too short to allow a normal gas discharge therebetween[,]*;* means for applying a relatively low voltage between said cathode and said anodes on the insulating plate to develop a gas discharge therebetween[,]*;* means for developing on the other side of the insulating plate[,] a relatively high voltage between said control-electrodes and said luminescent screen electrode, said relatively high voltage being lower than the value required to produce a gas discharge between said control electrode of the insulating plate and said screen electrode[,]*;* means for selectively *igniting* [triggering] a gas discharge [adjacent] *between said cathode and one of* said rows of anodes *and for skipping said gas discharge from said cathode row-to-row*[,]*;* and means for selectively applying a positive potential to said control electrode columns for forming an image on said luminescent screen by extraction of electrons through said perforations in said insulating plate.

19. A luminous discharge device as defined in claim [11,] *18,* wherein the side of said insulating plate towards said screen electrode is coated at least in the area of said transistors with an insulating protective layer.

Claims 2-10, 16, and 17, dependent on amended claims, are determined to be patentable.

* * * * *